United States Patent
Naumov et al.

(10) Patent No.: US 6,851,317 B2
(45) Date of Patent: Feb. 8, 2005

(54) DEVICE FOR MEASURING HORIZONTAL ACCELERATION

(75) Inventors: Michael Naumov, 10/18 Tar'ad, Ramat Gan (IL), 52503; George Naumov, Ramat Gan (IL)

(73) Assignee: Michael Naumov, Ramat Gan (IL)

( * ) Notice: Subject to any disclaimer, the term of this patent is extended or adjusted under 35 U.S.C. 154(b) by 0 days.

(21) Appl. No.: 10/100,299

(22) Filed: Mar. 19, 2002

(65) Prior Publication Data

US 2003/0177830 A1 Sep. 25, 2003

(51) Int. Cl.[7] .......................... G01C 17/38; G01C 25/00; G01P 15/00
(52) U.S. Cl. ...................................... 73/514.09; 73/1.75
(58) Field of Search .......................... 73/514.09, 514.11, 73/514.13, 514.05, 1.75, 514.02, 861.44, 861.45, 861.42, 861.47, 861.345; 33/366.15, 366.19, 366.21

(56) References Cited

U.S. PATENT DOCUMENTS

| | | | | |
|---|---|---|---|---|
| 4,095,547 A | * | 6/1978 | Benington | 114/122 |
| 4,455,500 A | * | 6/1984 | Savit et al. | 310/312 |
| 4,651,433 A | * | 3/1987 | Mohr | 33/367 |
| 5,191,713 A | * | 3/1993 | Alger et al. | 33/315 |
| 5,279,040 A | * | 1/1994 | Kippelt et al. | 73/514.05 |
| 5,351,539 A | * | 10/1994 | Ziegenbein et al. | 73/500 |
| 6,453,745 B1 | * | 9/2002 | Jalkanen | 73/514.09 |

* cited by examiner

*Primary Examiner*—Hezron Williams
*Assistant Examiner*—Tamiko Bellamy

(57) ABSTRACT

The device for measuring horizontal acceleration consisting of two similar hermetically sealed vessels containing liquid and provided with the pressure sensors connected to the differential scheme. The determination of the accelerations is done in terms of these sensors signals difference, which measuring the pressure in particular points. In these very points the pressures created by the vertical acceleration are equal in terms of each other, the ones created by the horizontal acceleration are different.

3 Claims, 4 Drawing Sheets

DEVICE FOR MEASURING HORIZONTAL ACCELERATION

FIELD OF ART

The invention refers to measuring technology and can be used in navigational, piloting and marine navigational systems and devices, in automobile systems for movement stabilizing, etc.

BACKGROUND OF THE INVENTION

Linear accelerometers are used for measuring horizontal acceleration of mobile objects in any plane (horizontal component of absolute acceleration vector in this plane). These accelerometers can be positioned directly on the mobile object body or on a platform positioned on it and stabilized in a horizontal plane. Each accelerometer possesses an inertial mass which is represented by a solid body or a liquid.

Liquid accelerometer is of higher sensitivity.

The main considerable drawback of any known accelerometer appears to be a harmful (crossing) influence of vertical acceleration (vector vertical component of absolute acceleration) with inclined position of the accelerometer. This harmful influence is rather high even with insignificant accelerometer tilting (i.e. tilting of the base where it is positioned). E.g. in inertial navigational systems with tilting for only 1 angular minute, the error in location determination is equal to 18.5 km per each hour of movement, which is often unacceptable.

The closest analogue (prototype) of the solution proposed is represented by a device for measuring horizontal acceleration of mobile object developed earlier by the authors of the proposed invention. This device also consists of two interconnected sealed hollow vessels filled with flowing working medium (liquid, gas or the mixture thereof), and two pressure pickups connected with them and having their outputs switched into differential scheme. That's why horizontal acceleration, in the prototype as well, is determined also according to difference in pressure signals. In this device, contrary to those mentioned above, the harmful influence mentioned is eliminated, but only with positive vertical acceleration. It is attained by measuring pressures in points where the heights of working media vertical columns over them remain equal when changing within permissible tilting, and application of non-congruent contours in vessel cross-sections provides for measuring only the horizontal acceleration (but only with positive vertical acceleration).

It is to be taken into consideration that, from the point of view of setting up the problem, the known solutions produce absolutely unsuitable signals with the mobile object (flying vehicle) turned upside-down.

As, with free fall, vertical acceleration is equal to zero (weightlessness phenomenon), cases of negative vertical acceleration occur with movement downward (to the Earth), with acceleration higher than the acceleration of the free fall during vibrations, hitting air pockets, etc.

The aim of the solution proposed consists in increasing accuracy and widening the field of application for the device measuring horizontal acceleration, in particular not only with positive, but negative vertical accelerations, thus making this device a universal one.

SUMMARY OF THE INVENTION

The aim mentioned can be attained within the permissible tilting of the device proposed (i.e. tilting of the base where it is positioned) by measuring pressure difference in points where pressures created by positive as well as negative vertical accelerations are equal, but pressures created by horizontal accelerations are different.

To attain this, the proposed device for measuring horizontal acceleration consists of two sealed, rigidly connected, preferably similar, hollow vessels filled with a flowing working medium (liquid, gas or their mixture), and even number of pressure pickups connected with the vessels and having outputs switched in to the differential scheme in pairs.

Contour of the inner cavity cross-section in each vessel is situated in the plane where horizontal acceleration is measured.

In this contour the authors have chosen an upper and, in contrast to the prototype, a lower point which remain as such (upper and lower) within the permissible tilting of the device in working position.

Points for measuring pressure have been chosen to be situated in the similar places in the inner cavities of the vessels, i.e. with, in mind, congruent movement of the inner cavity of one vessel relative to the similar cavity of another vessel up to their complete overlapping, the points are superposed as well.

At the same time, these points have been chosen to be similarly positioned on parallel straight lines in the plane of acceleration measurement and passing through the upper and lower points, i.e. at the same distances from the upper points and at the same distances from the lower points.

This arrangement of the points for measuring pressure excludes the harmful influence of vertical accelerations (positive and negative) as well as lateral accelerations, i.e. directed perpendicularly to the plane of acceleration measurement.

Contour of inner cavity cross-section in each vessel has been chosen in the plane of acceleration measurement as being asymmetrical to the straight line passing through upper and lower points.

This asymmetry of the contour means that its extreme points on the horizontal line are situated at different distances on both sides of this straight line. In this case the contour appears to be asymmetrical to each vertical (vertical line) passing through upper and lower points.

At the same time these contours of inner cavities in the vessels are chosen as anti-oriented in relation to each other in the plane of acceleration measurement. This means that the most remote horizontal extreme points of the contours mentioned are situated on different sides of the parallel lines mentioned.

The mentioned asymmetry and anti-orientation of the contours mentioned makes them non-congruent (with parallel transfer they cannot be superposed), thus permitting to measure horizontal acceleration.

BRIEF DESCRIPTION OF THE DRAWINGS

The invention is explained by the drawings attached where.

DETAILED DESCRIPTION OF THE INVENTION

Figure 1:
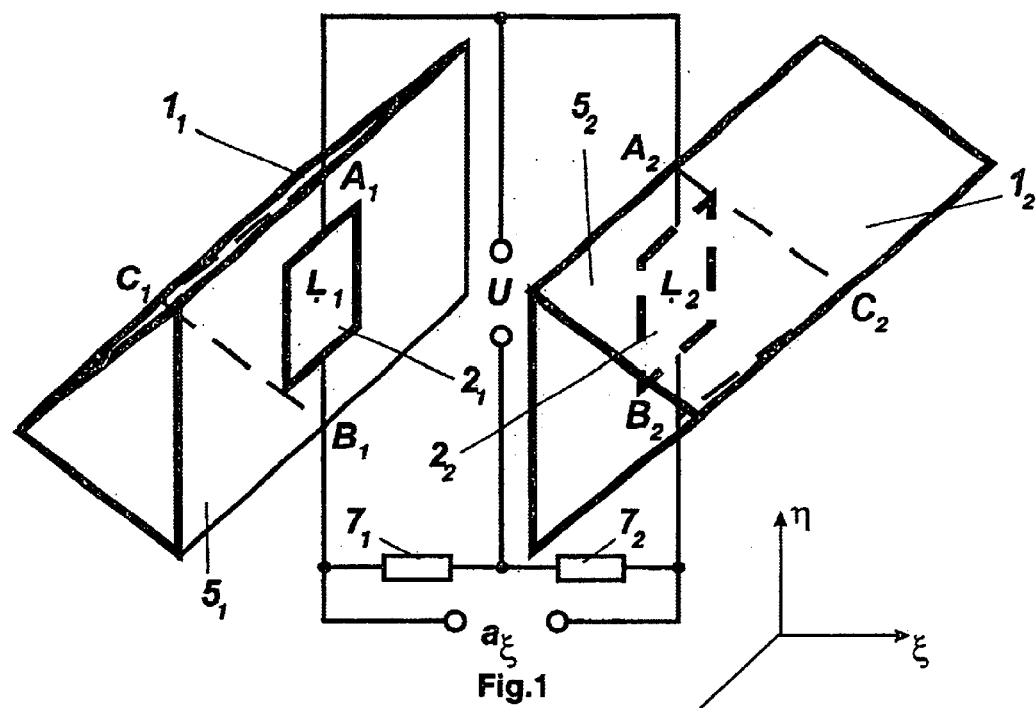
FIG. 1—scheme of the device proposed with 2 pressure pickups
Figure 2:
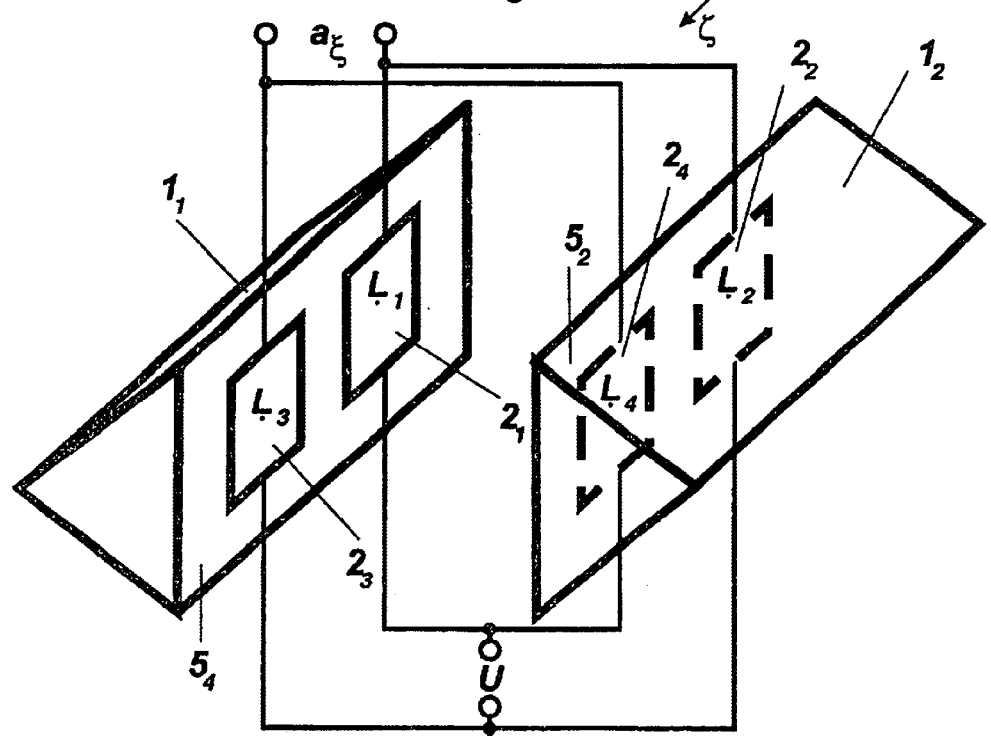
FIG. 2—scheme of the device proposed with 4 pressure pickups

The proposed device for measuring horizontal acceleration $a_\xi$ (DMHA) consists of two sealed, rigidly connected, essentially similar, hollow vessels $1_1$ and $1_2$ (FIGS. 1,2), filled with flowing working medium (e.g. liquid), as well as an even quantity of pressure pickups, in particular $2_1$ and $2_2$ (FIG. 1), $2_1$, $2_2$, $2_3$, $2_4$ (FIG. 2) switched to a differential block (differential scheme) 3 (FIGS. 3,4) and connected to the vessels. The vessels are non-congruently fixed on the base 4 (FIGS. 3,4), and pressure pickups are shown by being fixed on side walls $5_1$ and $5_2$ of vessels $1_1$ and $1_2$ (FIGS. 1,2). Body of the mobile object or platform stabilized in horizontal plane can serve as a base.

FIG. 1 shows the points marked for inner cavities of vessels in the plane for measuring horizontal acceleration $a_\xi$ (further—measurement plane), and FIGS. 1, 2 show pressure pickups marked by rectangles for simplification, each rectangle containing a point in the center where pressure measurement is carried out by the given pressure pickup.

Figure 3:
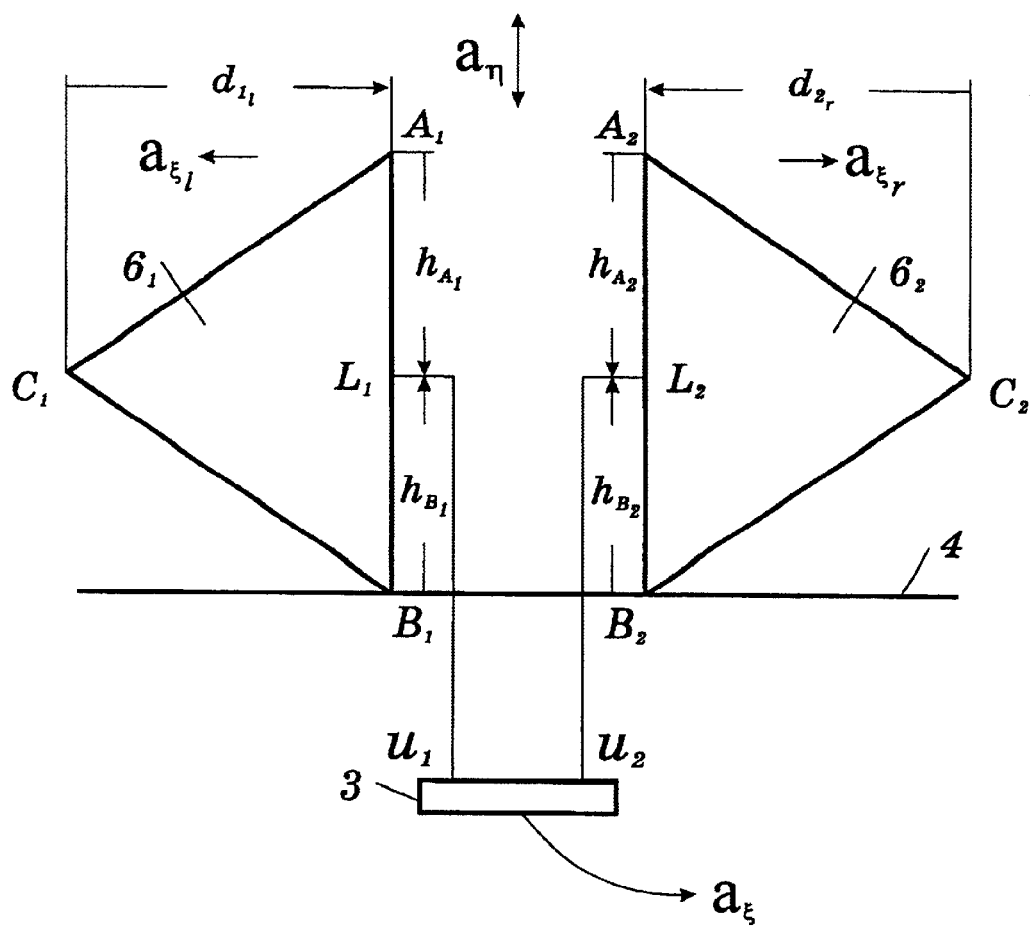
FIG. 3—horizontal position of the contours in inner cavities cross-section of the vessels with characteristic points according to the aim set forth.
Figure 4:
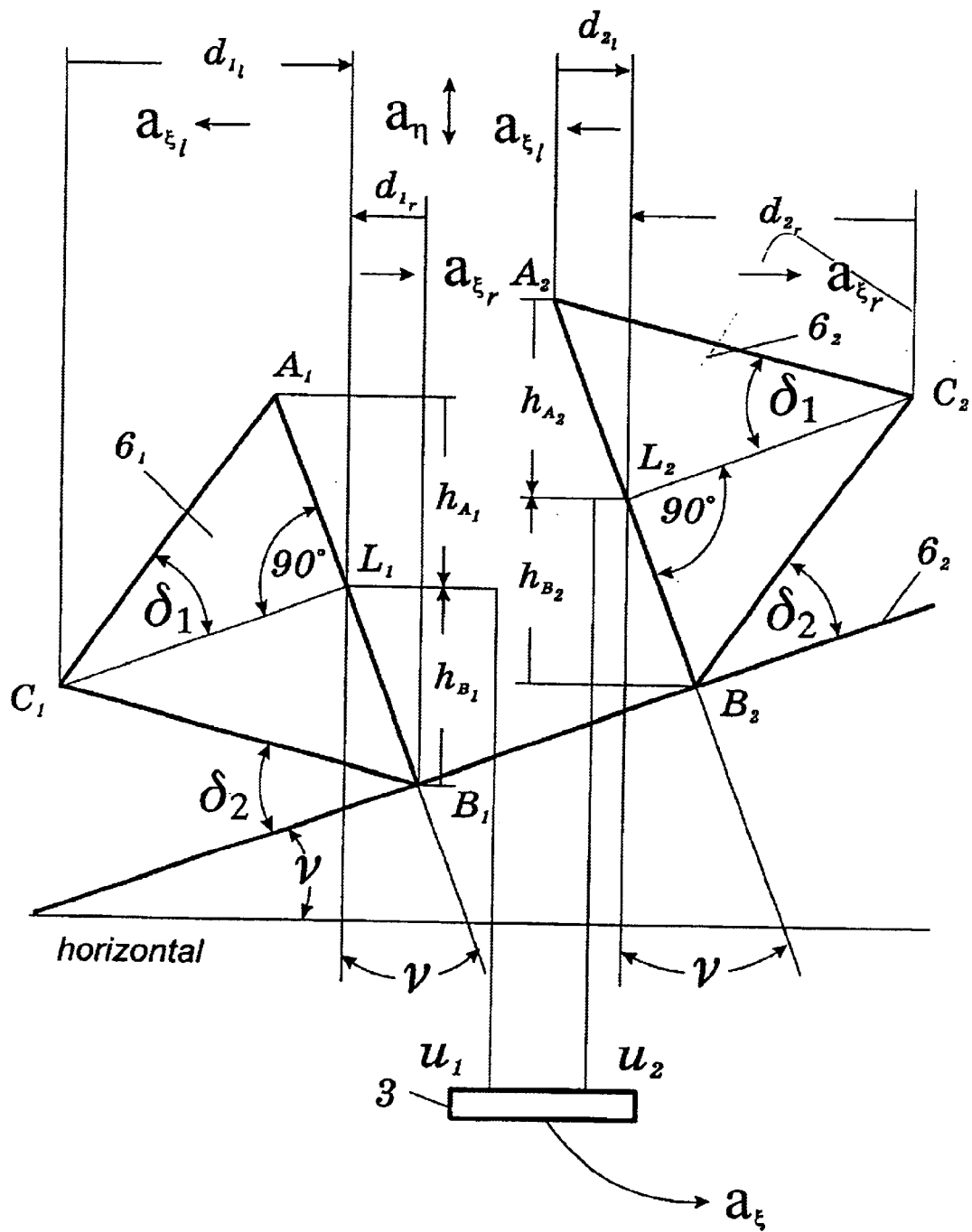
FIG. 4—tilted position of the contours in inner cavities cross-section of the vessels with characteristic points according to the aim set forth.
Figure 5:
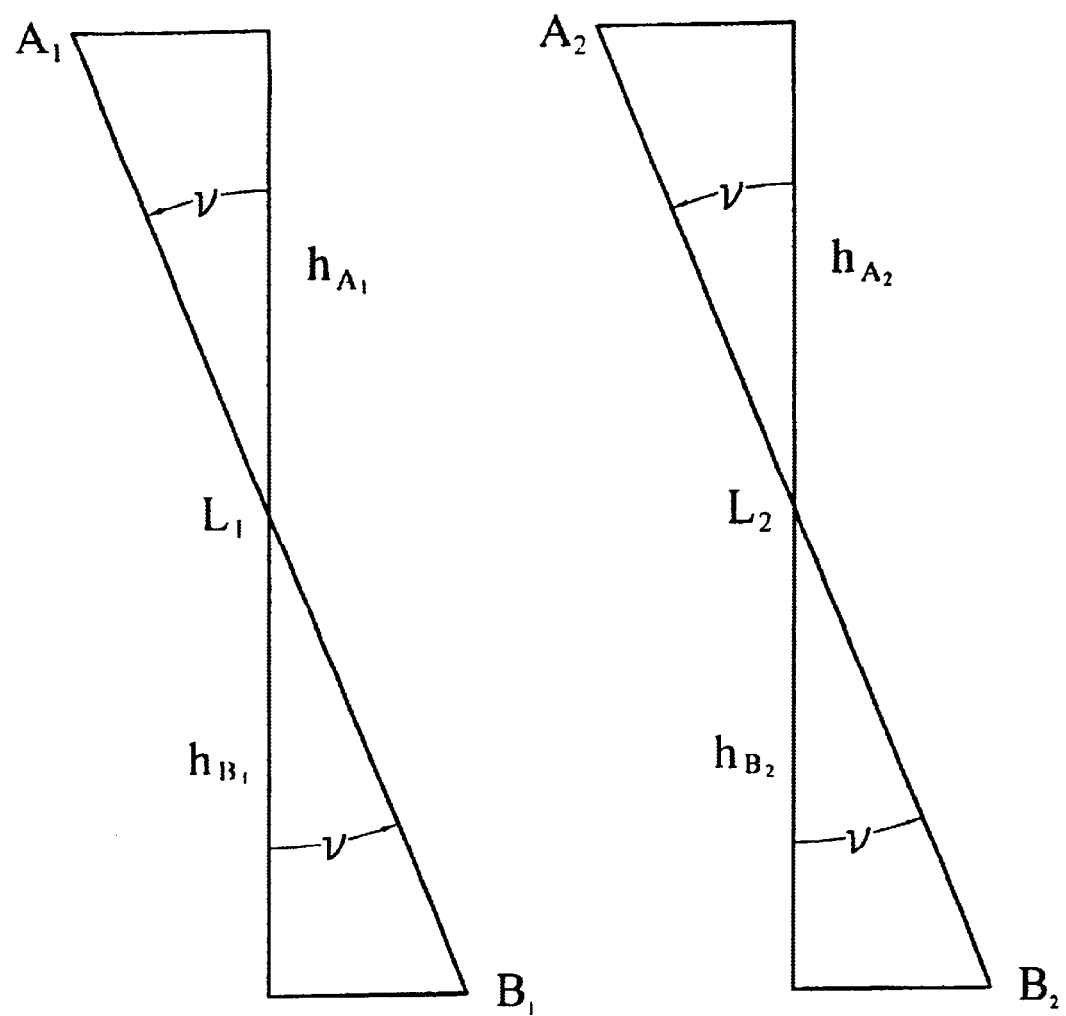
FIG. 5—is used for proof of independence in measuring horizontal acceleration from the influence of cross accelerations (vertical and lateral).

FIGS. 3,4 show the direction of forces and accelerations by arrows on straight lines. Detailed description of the proposed DMHA is given for an embodiment with one pair of pickups $2_1$ and $2_2$ (FIGS. 1,3,4). Peculiarities of the embodiment with two pairs of pickups are described briefly in relation to the first embodiment.

On the contours $6_1$ and $6_2$ (FIGS. 3,4) of the inner cavities cross-sections of vessels $1_1$ and $1_2$ (further vessel cross-sections) points for pressure measurement $L_1$ and $L_2$, upper points $A_1$ and $A_2$, lower points $B_1$ and $B_2$ and extreme points $C_1$ and $C_2$ are chosen, i.e. the most reared ones along the horizontal line from pressure measurement points $L_1$ and $L_2$ correspondingly (FIGS. 1,3,4).

Points for measuring pressure in each pair, in particular $L_1$ and $L_2$, $L_3$ and $L_4$ are positioned similarly in similar inner cavities of the vessels, i.e. at an equal distance from the corresponding points in these cavities. Or otherwise, with congruent positioning of the vessel's cross-sections (which can occur before their fixing on the base 4) and their, in mind, parallel transfer up to complete overlapping (which is possible due to vessels' similarity), the points of pressure measurement per each pair (in particular $L_1$ and $L_2$, $L_3$ and $L_4$,) are also superposed.

Moreover, points for measuring pressure in each pair are positioned similarly not only inside the inner cavities of vessels but on parallel lines, which are passing (correspondingly) through upper and lower points, i.e. at the equal distances from upper points and at equal distances from lower points, in particular $A_1L_1=A_2L_2$, $B_1L_1=B_2L_2$.

In this case upper points $A_1$ and $A_2$ and lower points $B_1$ and $B_2$ remain the same (i.e. upper and lower) within the limits of permissible tilts, i.e. with DMHA tilting for the angle $v<\delta$ (where $v$ is the angle of the base 4 non-horizontality in the measurement plane, $v<\delta_1$, $v<\delta_2$) ((FIG. 4).

Contours $6_1$ and $6_2$, as well as characteristic points (points of measuring pressure $L_1$ and $L_2$, upper points $A_1$ and $A_2$, lower points $B_1$ and $B_2$, extreme points $C_1$ and $C_2$) are chosen so that they are situated in the measurement plane.

The measured acceleration $a_\xi$ is a projection of an absolute acceleration vector in the measuring plane on a horizontal plane, it is directed along the horizontal axis $\xi$.

In the differential scheme (differential block) 3 a signal from one pressure pickup in each pair is subtracted from the signal of another pressure pickup in the same pair (in particular the signal of pressure pickup $2_2$ is being subtracted from the signal of pressure pickup $2_1$).

Electrical bridge, magnetic amplifier with differential scheme, electric circuit with the electric parameters difference (electric voltage, resistance, capacitance and inductance), etc. can be used as a differential scheme.

In the variant described electric bridge is being used composed of 4 arms (FIG. 1). Neighboring arms of this bridge include pressure pickups $2_1$ and $2_2$, and other arms can include, e.g. resistors $7_1$ and $7_2$ (those with equal electric resistances are preferable). Electric voltage U is delivered to this bridge via one of its diagonals, signal $a_\xi$ being taken from another diagonal. With existence of equally acting disturbances, e.g. changes in temperature, resistances of pressure pickups $2_1$ and $2_2$ are similarly changed, and, thus, erroneous signal at electric bridge outlet doesn't appear in these cases.

Principally any known pressure pickups can be used as pressure pickups, in particular resistance strain gauges ($2_1$ and $2_2$, $2_3$ and $2_4$). In this case they can be positioned on the inner or on the outer side of side walls $5_1$ and $5_2$ of vessels $1_1$ and $1_2$ correspondingly.

In case semiconductor strain gauges are used (those where specific resistance changes due to pressure changes), they can be positioned on the inner sides of side walls.

In case wire or film (foil) strain gauges are used, they can be positioned on the side walls made of elastic diaphragms, which, under the action of pressure, are deformed (elongated or compressed). In this case the strain gauges can be positioned on the outer as well as on the inner sides of side walls of the vessels.

Any pressure pickup sends the signal of one value corresponding to a definite point of pressure measurement, though many points of the sensitive element of this pickup can give reaction for pressure changes. This signal also corresponds to a definite point of the sensitive element (further—point of pressure signal). Depending on the shape of the sensitive element this point can be represented by, e.g., the center of the circle, rectangle, etc.

It is obvious that for measuring pressure in any point, e.g. in $L_1$ or $L_2$, it is necessary to superpose this point with the point of pressure signal.

Such superposing (of two points in different surfaces or volumes) presents a known problem solved in many cases (e.g. superposing of a light source with the most acceptable point in the space, when matching false teeth, etc.). Analytical solution of such superposing is certified by experimental check.

Number of pressure measurement points used (and hence, pressure gauges) can be different, but it should always be even and in pairs.

To increase the sensitivity in the scheme of FIG. 2 four strain gauges $2_1$ and $2_2$, $2_3$ and $2_4$ are used being also positioned on side walls $5_1$ and $5_2$ of vessels $1_1$ and $1_2$. In this DMHA pressure pickups $2_1$ and $2_2$ measure pressure in points $L_1$ and $L_2$, and pressure pickups $2_3$ and $2_4$ measure pressure in points $L_3$ and $L_4$.

In this variant (FIG. 2) pressure pickups $2_1$ and $2_2$, as well as pressure pickups $2_3$ and $2_4$, correspondingly, are incorporated into opposite arms of the electric bridge.

FIGS. 3,4 show contours of vessels cross-sections in the shape of a triangle.

Contours of other shapes are also possible (preferably similar), but they should be non-congruent, this providing for the possibility of measuring horizontal acceleration. Such non-congruency is attained by asymmetry of each contour of cross-sections $6_1$ and $6_2$, as well as by their anti-orientation.

Under the asymmetry of each contour $6_1$ and $6_2$ we understand its asymmetry in the measuring plane within the limits of permissible tilting of the vertical (vertical line) passing through the upper point (correspondingly $A_1$ and $A_2$) and vertical (vertical line) passing through the lower point (correspondingly $B_1$ and $B_2$) and simultaneously asymmetrical to the line passing through upper and lower points (correspondingly passing through points $A_1$ and $B_1$, and points $A_2$ and $B_2$).

Anti-orientation of cross-section contours $6_1$ and $6_2$ in the measuring plane is understood as positioning of their extreme points along the horizontal $C_1$ and $C_2$ on both sides of the line segments of the lines mentioned (extreme point $C_1$ is situated to the left of line segment $A_1B_1$, and extreme point $C_2$ is situated to the right of the line segment $A_2B_2$).

Similar positioning of points for pressure measurement in inner cavities $L_1$ and $L_2$ of the vessels excludes harmful influence of lateral acceleration $a_\zeta$ (directed perpendicular to the measuring plane, i.e. along the horizontal axis $\zeta$). It can be explained by the fact that the lengths of horizontal columns of liquid acting on points for measuring pressure $L_1$ and $L_2$ in lateral direction are equal irrespective of tilting.

Similar positioning of points for pressure measurement $L_1$ and $L_2$ on parallel lines passing through the upper and lower points (remaining as such within the limits of permissible tilts for angles $v<\delta$) excludes harmful influence of positive or negative vertical acceleration $a_\eta$ (vertical component of absolute acceleration vector). It can be explained by the fact that the heights of vertical liquid columns acting on points of pressure measurement $L_1$ and $L_2$, changing with tilting, remain equal within the limits of permitted tilts. This is true in relation to the heights of vertical columns of liquid situated above these points ($h_{A1}=h_{A2}$) and in relation to vertical columns of liquid positioned under them ($h_{B1}=h_{B2}$).

At the same time with the existence of horizontal acceleration $a_\xi$ at the DMHA output a signal is to appear proportional to this acceleration. Thus, if horizontal acceleration is directed to the left ($a_{\xi l}$), the length of horizontal column of liquid $d_{1l}$ acting on the point for pressure measurement $L_1$ appears considerably longer than the length of the horizontal column of liquid $d_{2l}$ acting on the point of pressure measurement $L_2$ (FIGS. 1,3,4). That's why in this case signal $U_1$ coming to differential block (differential scheme) 3 from pressure pickup $2_1$ appears to be considerably larger than signal $U_2$ entering the same block from pressure pickup $2_2$. Due to this difference $\Delta U=U_1-U_2$ is to be proportional to acceleration $a_{\xi l}$, whose signal is taken at the output of differential block (differential scheme).

And, vice a versa, if horizontal acceleration is directed to the right ($a_{\xi r}$), the length of horizontal column of liquid $d_{2r}$ acting on the point for pressure measurement $L_2$ appears considerably longer than the length of the horizontal column of liquid $d_{1r}$ acting on the point of pressure measurement $L_1$ (FIGS. 3,4). That's why in this case signal $U_2$ coming to differential block (differential scheme) 3 from pressure pickup $2_2$ appears to be considerably larger than signal $U_1$ entering the same block. Due to this difference $\Delta U=U_2-U_1$ is to be proportional to acceleration $a_{\xi r}$, this signal being taken at the output of differential block (differential scheme).

Thus, in the differential (output) signal only the pressure signal is present created by horizontal acceleration $a_\xi$, and signals created by vertical and lateral acceleration with any sign are absent.

Rigorous proof of the measurements by the proposed device of horizontal acceleration $a_\xi$ irrespective of the action of vertical ($a_\eta$) and lateral ($a_\zeta$) accelerations is presented in the appendices to the given patent application, as well as in description to the patent [3] developed earlier by the authors of the proposed solution.

Investigations carried out by the authors show that with small values of angles v (for which we can consider with high accuracy that cos v=1) or with slight changes in these angles v (for which with high accuracy we can consider cosv=const) we can ignore changes in horizontal columns of the working medium acting on the points of measuring pressure ($L_1$ and $L_2$) due to their rather insignificant values and consider that DMHA measures the value $a_u=ka_\xi$, where k=const (in particular with small values of v we can consider k=1).

Sensitivity threshold of DMHA is practically equal to zero, as pressure pickups are always kept ready for operation (overcoming of non-sensitivity zone is not required) due to action of the pressure delivering liquid into vessels and pressure created by vertical columns of the working medium positioned over the points of pressure measurements.

That's why for DMHA there is no limit in attaining accuracy satisfying the highest demands.

There is no possibility to use the sensitivity threshold equality to zero in the accelerometer as it reacts to tilts even with $a_\xi=0$. (In the prototype we can use the sensitivity threshold equal to zero only with $a_\eta>0$). So, higher accuracy is being attained in DMHA in all the range of $a_\eta$ values.

Thus, the principle of highly accurate measurement of horizontal acceleration $a_\xi$ in the given solution is based on measuring pressure difference (irrespective of permissible tilting) in points where the height of vertical columns of working medium over them ($h_{A1}$ and $h_{A2}$) and under them ($h_{B1}$ and $h_{B2}$) are equal as well as the lengths of horizontal columns with working medium acting on points of pressure measurement in lateral direction are also equal, and horizontal columns with the working medium acting on these points in the measuring plane are different.

DMHA operation in the embodiment described consists in measuring pressure signals in points $L_1$ and $L_2$ by pressure pickups $2_1$ and $2_2$, their delivery to the differential scheme and taking signal $a_{86}$ from the output of this scheme. (FIGS. 3, 4).

In the scheme in FIG. 1, where electrical bridge is being used as differential scheme, with $a_\xi=O$, the bridge is balanced and the signal at its output is equal to zero. With $a_\xi?O$, changes in resistance in one of the pressure pickups $2_1$ and $2_2$ become considerably higher than changes in resistance of another pickup and due to this bridge equilibrium is disturbed and signal $a_\xi$ is taken at its output.

Functioning of the solution proposed is not changed with the position of the mobile object of the flying vehicle turned upside-down, as in this case lower points $B_1$ and $B_2$ become upper ones, and upper points $A_1$ and $A_2$ become lower ones.

On the basis of the above said the following conclusion can be made:

equality of heights in vertical columns of the working medium over and under the points of pressure measurement exclude harmful influence of vertical acceleration (not only positive but negative as well);

equality of lengths in horizontal columns of the working medium acting on points of measurement in the direction perpendicular to the plane of pressure measurement excludes the harmful influence of lateral horizontal acceleration $a_\zeta$ acting in this direction;

anti-orientation of asymmetric contours of cross-sections (non-congruence of these contours) provides for measuring horizontal acceleration;

application of differential scheme excludes harmful influence of a number of other disturbing factors besides vertical ($a_\eta$) and lateral ($a_\zeta$) accelerations (e.g. vibrations, changes in temperature, etc.);

practical equality of sensitivity threshold to zero and possibility of utilizing this fact with any vertical accelerations (according to both value and sign) provides for the possibility of obtaining super high accuracy unattainable by the known solutions;

independence of measuring acceleration $a_\xi$ in relation to accelerations $a_\eta$ and $a_\zeta$, as well as other disturbing factors (vibrations, changes in temperature, etc.), possibility of using sensitivity threshold practically equal to zero makes the solution proposed a universal one;

presence of lower point within permissible DMHA tilting in working position in any contours from cross-section $6_1$ and $6_2$, its asymmetrical position relative to the straight line passing through the upper and lower points, and anti-orientation of such contours appear to be the new essential distinctive features when compared with the known solutions.

The value of the invention proposed is not limited by only increasing the accuracy of measurement of acceleration and widening the field of application. It opens wide possibilities for solving a number of important and up to now insufficiently accurate or effectively solved problems, e.g. those mentioned below.

The solution proposed permits to solve the main problem of autonomous navigation: determination of vertical on mobile objects with especially high accuracy (with error not surpassing a fraction of arc second); without necessity in long-term preliminary alignment as in case of inertial vertical gyro; application of highly accurate gyroscopes (and even without them), application of complicated, expensive, heavy and cumbersome gyro platform and provision of Schuler's non-disturbance conditions.

Such determination of the vertical permits to solve the problem of acceptable long-term application of inertial navigational systems without platforms (i.e. those where acceleration pickups are mounted not on the gyro platform, but directly on the body of a mobile object) and without necessity of being adjusted by other navigational means, thus making them significantly simpler, lighter by weight and cheaper.

Special attention should be paid to the application of the solution proposed in the systems of car movement stabilizing. At present for determining horizontal acceleration they use an accelerometer having the plane of measurements perpendicular to the longitudinal axis of the car. However, due to inclination of the road (up to several degrees) highly sensitive accelerometer disturbs normal functioning of this system with slightest movements on it. That's why there appears the necessity to exclude the influence of these inclinations, thus making this system rather complicated.

With the application of the proposed solution in the same system of car movement stabilizing harmful influence of road inclinations will be eliminated making this system less complicated, cheaper and lighter by weight. As this system doesn't necessitate acceleration measurement, and only reaction to its appearance is necessary, the device applied can be even not of rather high accuracy.

Moreover, the device proposed permits to solve the problem of developing system of car movement stabilizing without introduction of data on future profile of the route.

Research conducted by the authors shows that there exists the most optimal form of hollow cavity of the vessels, and the only optimum pair of points for measuring pressure in each pair of cross-sections.

Thus, the construction as disclosed by the invention is based on the pressures difference measuring in special points, the heights of vertical columns of liquid above and below the latter being equal. In these points the pressures caused by the vertical acceleration not only in horizontal but also in vertical position of the device in hand are considered to be equal, and those caused by the horizontal acceleration are different. Detrimental effect of the vertical acceleration even in the tilted position of the device in hand is prevented thereby. Therefore, in accordance with the invention there is provided a construction characterized in that the acceleration-measuring device measures horizontal acceleration but seeming one.

We claim:

1. Device for measuring horizontal acceleration comprising:

two sealed, rigidly interconnected, essentially similar hollow vessels, filled with flowing medium, e.g. liquid, having upper and lower points in each of the asymmetrical vessel inner cavity cross-section anti-oriented contours, staying in contours as such within permissible tilting of the device in the working position, the even number of pressure pickups, connected with vessels, particularly two pressure pickups with chosen points of pressure measurements similarily set in the vessel inner hollows on the parallel straight lines, containing upper and lower points mentioned above, differential scheme on the output of the device with the pressure pickups connected to it.

2. The device of claim 1, wherein the cross-section counter of the inner hollow of each vessel is chosen to be asymmetrical to the straight line of this contour, containing upper and lower points mentioned above.

3. The device of claim 2, wherein the mentioned anti-orienting of the asymmetrical contours cross-sections of the vessel inner hollows is performed by setting the most remote, horizontal points of these counters on different sides from the parallel straight lines previously mentioned.

* * * * *